117
4

Feb. 26, 1974 R. L. TRAUGER ET AL 3,794,509

CARBON DISK PROCESSING TECHNIQUE TO RETARD OXIDATION

Filed June 29, 1971

INVENTORS

RONALD L. TRAUGER
ROBERT L. ZAREMBKA

BY

Oldham & Oldham

ATTORNEYS

United States Patent Office 3,794,509
Patented Feb. 26, 1974

3,794,509

CARBON DISK PROCESSING TECHNIQUE TO RETARD OXIDATION

Ronald L. Trauger, Tallmadge, and Robert L. Zarembka, Akron, Ohio, assignors to The Goodyear Tire & Rubber Company, Akron, Ohio Filed June 29, 1971, Ser. No. 157,954
Int. Cl. B44d *1/20*
U.S. Cl. 117—4 6 Claims

ABSTRACT OF THE DISCLOSURE

A method of processing disk blanks made from resin impregnated graphite or carbon cloth to improve the oxidation resistance of the end product. The disk blanks are processed by resin impregnation and baking and machined to almost the final desired configuration and subsequently subjected to further resin impregnation and bake cycles to form a hard residue on the exposed surfaces of the disk blanks. The disks are then ground to size with the residue remaining on all but the wear surfaces thereof.

At the present time carbon disks such as aircraft brake disks are formed by laying up graphite or carbon cloth to form a blank, subjecting the blank to repeated cycles of resin impregnation and baking to increase the density of the blank, and subsequently cutting the disk configuration from the blank and machining the disk to the desired final dimensions. While disks formed in this manner possess excellent friction properties, they are subject to oxidation, especially at the high operating temperatures encountered in aircraft brake assemblies. The oxidation is most pronounced on the exposed surfaces of the disk and results in deterioration of the disk and in a shortening of the useful life of the disk.

It is the primary object of the present invention to provide a technique for processing carbon disks to improve the oxidation resistance thereof.

A further object of the present invention is the provision of a technique for processing carbon disks which provides greatest oxidation resistance on those portions of the disks which are most subject to oxidation in use.

The above and other objects of the invention will become apparent in the following detailed description and are achieved by providing a technique for processing carbon disks in which disk blanks are formed in the usual manner but are cut into disk configuration and machined to nearly the final dimensions prior to completion of the resin impregnation and baking cycles. The impregnating and baking cycles are then completed to bring the density of the disk to the desired level and, subsequently, the friction surfaces of the disk are machined to their final dimensions, leaving an oxidation resistant coating on all other surfaces of the disk.

For a more complete understanding of the invention and the objects and advantages thereof reference should be had to the following detailed description and the accompanying drawing wherein there is shown a preferred embodiment of the invention.

Figure 1:
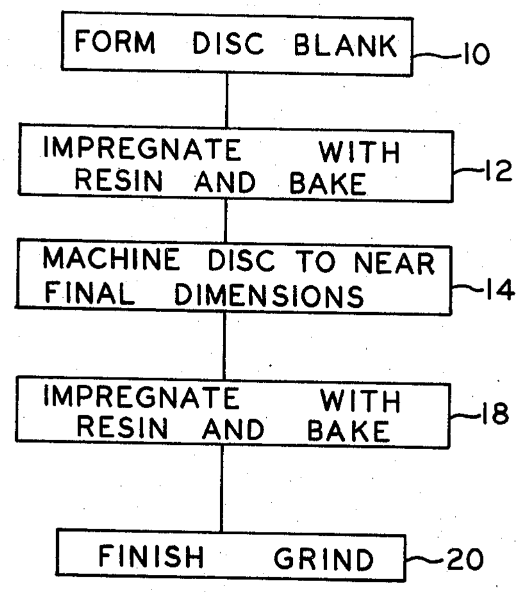
FIG. 1 is a block diagram of the disk forming technique of the present invention.

As is illustrated in FIG. 1, the technique of the present invention comprises the steps of forming a disk blank from graphite or carbon cloth, impregnating the blank with a resin and subsequently baking the blank, with the impregnating and baking steps being reepated a number of times. The disk blank is then machined to nearly the final configuration and dimensions. The wear surfaces of the disk, the surfaces of the disk which contact adjacent disks during brake operation, are then machined slightly oversize and the disk is subsequently subjected to additional impregnating and baking operations to form a hard oxidation resistant coating or residue on all outer faces of the disk. At the completion of impregnating and baking cycles the wear surfaces of the disk are finished ground to their desired final dimensions.

Both the number of cycles of resin impregnation and baking performed prior to the machining of the disk blank and the total number of cycles may vary. A typical conventional process of forming carbon brake disks may include a first low temperature baking or curing step followed by three low temperature baking steps, a first high temperature baking step followed by two bakings at a low temperature, a second high temperature baking and two low temperature bakings, and a final high temperature baking step with the disk blank being impregnated with a resin prior to each baking, for example, by dipping the disk blank into a liquid resin. Typical resins and forming techniques are defined in U.S. Letters Patent Nos. 3,672,-936 and 3,552,533. Each impregnating and baking step increases the density of the disk blank with the increase being more rapid at the beginning of the process. The present invention contemplates that the disk blank will be removed from the processing sequence for machining when its density is sufficient to permit the blank to be machined. This occurs when the density of the blank has reached approximately 40% to 80% of its final density. Depending on the particular impregnating and baking sequence employed, the disk blank may be withdrawn from the sequence for machining at any time between ½ and ¾ of the sequence. In fact in some cases the disc is initially formed to the final dimension or size, such as in a tape or circumferentially wound disc.

In effect the process of the invention is simply to have enough baking exposure to cure or graphitize the resin and fibers in the disk so as to permit formation of the desired oxidation resistant coating on the non-rubbing surfaces of the disk.

The disk blank when removed from the processing sequence is cut to an annular disk configuration with the internal and external diameters and the drive notches of the disk being machined to their final dimensions. The sides or wear faces of the disk are machined oversize, for example, to 0.030 inch per side greater than the thickness of a completed disk. Upon completion of the resin impregnating and baking sequence, the faces are machined to their final dimensions, removing the resin coating from these surfaces.

Figure 2:
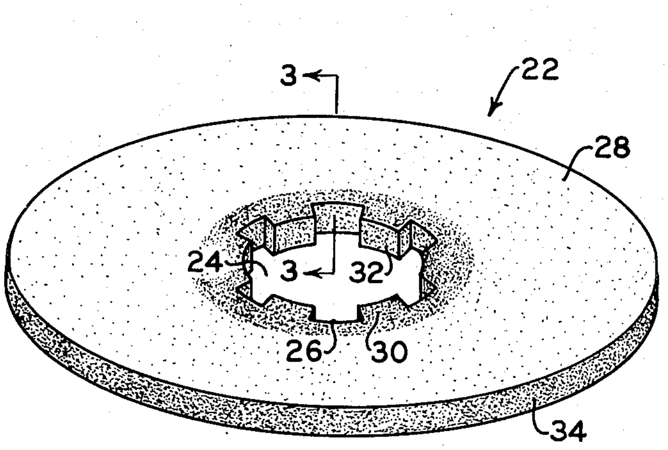
FIG. 2 is a perspective view of a brake disk fabricated in accordance with the techniques of the present invention.
Figure 3:
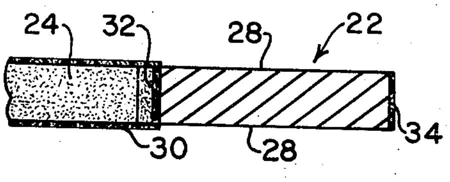
FIG. 3 is a fragmentary sectional view taken along the lines 3—3 of FIG. 2.

A brake disk 22 formed in accordance with the principles of the invention is illustrated in FIGS. 2 and 3. The disk 22 has a central hole 24 which is notched on its periphery as indicated at 26 to receive the splines or a torque tube. It should be understood that while the disk 22 is a stationary disk of an aircraft brake assembly the invention is not limited to this type of disk but may be applied to disks of other configurations. The disk 22 has parallel opposite wear faces 28. These faces 28 contact mating surfaces of adjacent disks having braking operation.

When the disk 22 is formed in accordance with the technique described above, the baked resin forms a hard residue 30, 32, and 34 on the exposed faces of the disk while leaving te wear surfaces 28 free of residue. It should be understood that while the drawing shows a sharp demarcation between the residue layer and the body of the disk, this is for purposes of illustration only. In actuality, the residue is diffused into the disk surface. The residue serves as a protective layer reducing the oxidation of the exposed surface portions of the disk during high temperature operating conditions. The wear faces 28 are free of baked residue to provide high friction engagement between adjacent disks.

While only the best known embodiment of the invention has been illustrated and described in detail herein it will be understood that the invention is not limited thereto or thereby. Reference should therefore be had to the appended claims in determining the true scope of the invention.

What is claimed is:

1. A method for forming carbon brake disks having improved oxidation retarding properties, which comprises the steps of (a) forming a disk blank of a carbon material;
(b) impregnating the blank with a resin;
(c) curing the impregnated blank by baking at a controlled temperature;
(d) repeating steps (b) and (c) a sufficient number of times to raise the density of the disk blank to at least a level sufficient to permit machining of the disk blank;
(e) machining the impregnted disk blank to the disk configuration;
(f) impregnating with resin and curing the impregnated disk to form a hard baked residue diffused into the surfaces of the disk; and
(g) machining the wear surfaces of the impregnated disk to their final dimensions, removing the residue only from these surfaces.

2. The method according to claim 1 wherein the impregnating and curing of steps (b) and (c) is repeated until the density of the disk blank is approximately 40% to 80% of the density of the completed disk.

3. The method according to claim 1 wherein the disk blank is cut in step (e) in such manner that the wear surfaces of the disk are of greater thickness than their final thickness, the other surfaces of the disk being cut to their final dimensions.

4. The method according to claim 3 wherein the thicknesses of the wear surfaces formed in step (e) are approximately 0.030 inch per wear surface greater than the final dimensions of the wear surfaces.

5. The method according to claim 1 wherein the curing steps include first curing steps at a low temperature and second curing steps at a high temperature, resin impregnation being effected prior to each curing step.

6. The method according to claim 5 wherein step (f) includes at least one first curing step at low temperature and at least one second curing step at high temperature.

References Cited

UNITED STATES PATENTS

| | | | |
|---|---|---|---|
| 3,342,627 | 9/1967 | Paxton et al. | 117—228 X |
| 2,862,748 | 12/1958 | Bailey et al. | 117—228 |
| 2,224,724 | 12/1940 | Elsey | 117—228 |
| 2,066,176 | 12/1936 | Girvin et al. | 117—Dig. 11 |
| 3,637,424 | 1/1972 | Miller | 117—228 |
| 3,316,138 | 4/1967 | Taylor | 117—4 |
| 3,552,533 | 1/1971 | Solon et al. | 117—46 X |

WILLIAM D. MARTIN, Primary Examiner
B. D. PIANALTO, Assistant Examiner

U.S. Cl. X.R.

117—8, Dig. 11, 64, 228; 244—110 A, 110 H, 111